United States Patent [19]
Vöhringer

[11] Patent Number: 4,506,625
[45] Date of Patent: Mar. 26, 1985

[54] POWDER SPRAY CHAMBER

[75] Inventor: Gerhard F. Vöhringer, Friedrichshafen, Fed. Rep. of Germany

[73] Assignee: ESB Elektrostatische Sprüh und Beschichtungsanlagen G.F. Vöhringer GmbH, Meersburg, Fed. Rep. of Germany

[21] Appl. No.: 520,065

[22] Filed: Aug. 3, 1983

[30] Foreign Application Priority Data

Aug. 10, 1982 [DE] Fed. Rep. of Germany ....... 3229717

[51] Int. Cl.³ ............................................. B05B 15/00
[52] U.S. Cl. ..................................... 118/312; 118/326; 55/302; 55/DIG. 46; 427/195; 427/421
[58] Field of Search ........................ 55/302, DIG. 46; 118/326, 312; 98/115 SB; 427/195, 421

[56] References Cited

U.S. PATENT DOCUMENTS

| 3,183,647 | 5/1965 | Lang | 55/302 X |
|---|---|---|---|
| 3,339,347 | 9/1967 | Otto | 55/302 X |
| 3,360,907 | 1/1968 | Clark et al. | 55/302 X |
| 3,902,455 | 9/1975 | Lehmann et al. | 118/326 |
| 4,094,654 | 6/1978 | Prinzing | 118/326 X |
| 4,260,400 | 4/1981 | Scalet | 98/115 SB X |
| 4,354,451 | 10/1982 | Vohringer et al. | 118/326 |
| 4,377,401 | 3/1983 | Laughlin | 55/302 X |
| 4,409,009 | 10/1983 | Lissy | 118/326 X |
| 4,417,541 | 11/1983 | Schafer | 118/326 |
| 4,430,956 | 2/1984 | Koch | 98/115 SB X |

FOREIGN PATENT DOCUMENTS

| 2514160 | 9/1976 | Fed. Rep. of Germany . |
|---|---|---|
| 3003158 | 4/1982 | Fed. Rep. of Germany . |
| 3214255 | 10/1983 | Fed. Rep. of Germany . |

Primary Examiner—Shrive P. Beck
Attorney, Agent, or Firm—Collard, Roe & Galgano

[57] ABSTRACT

There is provided a powder spray chamber for coating the surface of workpieces disposed in a coating space having a rotationally symmetrical filter carrier carrying a filter element on its mantle, the filter carrier being rotatingly mounted in an opening in a wall separating the coating space from a clean air space and having its free end sealingly projecting into said coating space, a vacuum source in said clean air space for creating a vacuum interiorly of said filter carrier, and cleaning means for cleaning said filter element.

15 Claims, 9 Drawing Figures

POWDER SPRAY CHAMBER

The present invention relates to a powder spray chamber for coating the surface of workpieces disposed in a coating space, including an inlet spray opening and a filter arrangement adjoining said coating space, the filter arrangement including a filter element having a large surface whose clean air side is connected to a vacuum source.

An essential feature in the evaluation of powder spray chambers relates to the rearranging period for changeover during a color change. Here, development at first has been directed to attaching the filter aggregate having several filter elements to all parts influencing the circulation of the powder to form a closed powder unit, which is replaced as a whole during any change of color (See DE-OS 28 35 474). This may be acceptable if, perhaps, only three color tones are being considered. However, as the number of colors required is, as a rule, much larger, a replacement of the entire powder unit requires an unduly large investment. Even when the mode of the replaceable powder unit is maintained during a changeover, it is still necessary to remove the individual filter elements temporarily for cleaning in preparation for the spraying of a different color tone.

This situation has led to the consideration of dispensing completely with the replacement of the powder units in favor of cleaning the individual filter elements according to demand.

When using the same filter elements, it is not possible to make use of all colors by using the cleaning technique of the prior art. The same filters can be used for closely related colors, but for unrelated colors individual powder particles can cause contamination of the coatings. Furthermore, it is relatively time-consuming to individually exchange the approximately 10 filter elements of a filter aggregate.

In other industries, for example in the textile industry, it is well known to use rotatable mesh drums, generally rotatable about a horizontal axis, provided with a cleaning arrangement along a mantle line for blowing out or suctioning off the mesh mantle (See DE-GM 18 90 422 and CH-PS 55489). The drum in such a case may also be arranged laterally adjoining an opening formed in an intermediate wall disposed between the chamber for clean air and the chamber for raw gas. Finally, by means of U.S. Pat. No. 1,649,220 for dust filters, it is also well known to stretch a filter track over the periphery of the mesh drum. This, however, requires a larger peripheral space for the filter drum, and clumsy manipulations for the purpose of replacing the filters. However, the time available for replacement of such filters during any change of color in powder coating arrangements does not permit the use of such an arrangement.

The arrangement according to the present invention therefore starts with the aforedescribed powder spray chamber, and has as its object the creation of a spray chamber in such a manner that it can be cleaned with minimal technical effort in a short time, or can be rearranged for any change of color, even when a large number of color tones are used.

For accomplishing this object, there is provided a rotationally symmetrical filter carrier in a chamber unit corresponding to a spraying station of a coating row having a gas-permeable mantle portion. The filter carrier is rotatably supported in an opening of a rearwardly disposed separating wall and sealingly projects therefrom its free end facing the coating space. The filter carrier sealingly carries a sleeve-like filter element on its gas-permeable mantle between gas non-permeable end portions by means of two frontal rings, the filter element being removable into the coating space, and cleanable by a cleaning arrangement associated with the gas-permeable mantle portion.

Here, one works with a filter element having a large surface area, which can also be removed easily and quickly and is larger by a multiple order than filter elements of the prior art. During a thorough cleaning, it is possible to accommodate the entire required filter surface on a single filter element within the available limited space. The replacement of the filter element, as well as the cleaning of the other powder-guiding surfaces can be accomplished exclusively from the interior of the chamber, so that these processes can basically be accomplished by a single person without any excessive consumption of time. Thus, the entire operation of changing colors can be accomplished quickly and easily, and for all color tones, basically only a single filter element is needed. Consequently an entire pallet of color tones can be maintained in the spraying program with low investment costs. The selected form of filter element has the advantage that it can be manufactured relatively compactly and inexpensively even though it has a large filter surface area.

Not only is replacement of the filters hereby facilitated, but the removable filter element can be thoroughly cleaned in its operating position on the mantle portion of the filter carrier. Furthermore, this cleaning is relatively simple because of the rotationally symmetrical implementation of the filter carrier, and can be accomplished quickly and thoroughly without the holder of the filter element requiring any change. Because of this, the operating life of the filter between replacements is considerably increased. It is also possible to use, between individual cleaning processes, different, and particularly neighboring, color tones, without the filter element itself having to be replaced.

The filter element can, in principle, be disposed in any suitable location in the coating space. However, it has been found to be advantageous if the axis of the filter carrier is directed horizontally approximately towards the center of the coating space and, if the cleaning arrangement is implemented as a blowing arrangement including at the lower mantle line of the filter element at least one downwardly directed blow nozzle. In this manner, the inlet spray opening and the filter arrangement can be disposed in a mostly conventional manner opposite one another. Also, the powder is released from the respective lower mantle line wherein its adhesive forces are considerably reduced because of the force of gravity acting outwardly. The powder can in most cases be further conveyed from this lower release location in a simpler manner, to the extent it is not already treated there directly. Furthermore, by this arrangement, the spray process is made more uniform, as suction can be applied from the entire circumference of the drum, namely, the air stream extends largely horizontally between the inlet opening and the filter element. This ensures that the powder streams are distributed somewhat uniformly along the cross-sectional surface at the workpiece.

The diameter of the filter element is basically limited only, on one hand, by the dimension of the chamber, and on the other hand, by its handleability. The latter is not of any great significance, if one starts with the assumption that two persons are always available for replacing the filter. However, the diameter of the filter element can be kept within limits primarily by its implementation as a zig-zag shaped, folded filter sleeve.

The frontal rings can also consist of elastically deformable synthetic material; for example, the ends of the filter rings can be foamed up, or otherwise sealingly set into the frontal rings.

Ring-shaped tensioning elements should be associated with the individual frontal rings, particularly annular tensioning bands, which, for example, can be quickly and reliably tensioned thereto by a screw, an eccenter, or the like, and again be released therefrom.

Although cleaning of a drum-shaped filter by an outwordly-disposed slit-like suction nozzle is known from DE-OS 26 40 219, suctioning off, as a rule, is neither necessary, nor useful, as the powder does not have to be further conveyed, but need only be released, so that it can be caught within the chamber, for example on the floor of the chamber. For cleaning for the purpose of a color change, also thin surface filters, like paper filters are substantially better suited than felt filters or fabric filters. Here, in the first place, one is concerned with a local impact-like streaming-through and deformation of the filter element, which is achieved by a blow stream being momentarily passed on from one filter groove to the next.

This further passage of the blow stream is known from DE-OS 27 02 592. According to this patent, a slit nozzle is allowed to rotate in a locally stationary folding filter sleeve, by using the recoil principle. This was possible due to the reason that the filter was disposed at an approximately upright axis. In the here preferred horizontal axis, if the filter were stationary, the powder impacting on top would remain positioned on the filter element, and would therefore change the air permeability thereof.

At least within the filter element, guide means for generation of a secondary stream can be disposed within the release region of the powder. Even if the central blow stream accomplishes deformation, and therefore actual release, it could be essential that a stream is also supplied from the exterior, so as to remove the released powder particles from the direct suctioning region and away from the drum, and particularly to convey them downwardly. Consequently, according to the invention, there are provided, external to the filter element, metal sheets at least on two longitudinal sides of the plane of the blow stream, for guiding the released powder particles from the suction region of the filter element.

In one embodiment of the invention, the blow nozzle is implemented as a slit nozzle disposed along a mantle line of the filter element. Then, momentarily, an entire fold of the filter is put under pressure and then unstressed. As a result of the available output of the compressor, the pressure and, consequently, the effective cleaning effect is, however, limited because of the large nozzle surface. It is, therefore, also possible to provide a point stream nozzle reciprocally moveable in the direction of the axis of rotation of the filter carrier and wherein the slit nozzle and the point stream nozzle can be switched-on selectively, namely, according to a prearranged program.

Even if cleaning is to be accomplished during operation primarily from the interior, it is not excluded that at least during spraying pauses, or prior to any replacement process, the powder is also blown off immediately from the exterior, as basically a full cleaning of the filter can be accomplished within the chamber according to proposals and means illustrated and described, for example, for a separate cleaning arrangement in the older patent application DE-P 32 14 255.2. Primarily, a complete cleaning of the filter element can be accomplished automatically for similar colors without any change of the filter, for example, during operating intervals, or during the night shift.

In principle, the filter carrier need only include two lateral holding rings rotatable about the filter axis, of which at least one is connected to a motor-actuated drive. This is primarily the case, if a cylindrical support is associated directly with the filter element, which can also transmit limited torsional forces. Normally, the holding rings are, however, united by a mantle portion supporting the filter element from the interior.

A storage arm advantageously projecting freely towards the coating space serves for storing at least a holding ring facing the coating space with a front wall thereof, and wherein the storage arm is advantageously formed as a supply for pressurized gas for at least one blow nozzle for cleaning purposes.

According to another inventive proposal, the filter carrier is flyingly supported on the frontal side facing away from the coating space by means of a ring bearing in an intermediate wall interposed between a space for the raw gas, and a space for the clean air. In this manner, first of all, the entire construction is simplified, and supply of compressed air, and particularly use of a reciprocally moveable blow nozzle is facilitated.

Particularly, in this construction, it is advantageous to provide a stepwise acting switching arrangement as a drive to the filter carrier, approximately in a manner, so that on the outer rim of an annular flange connected to the filter carrier, there is formed a toothing, which engages an advancing latch. If then the advancing angle is selected so as to approximately equal the partial fold angle between adjoining filter folds, then a complete switching advance in an impact-like manner into the next fold is always accomplished.

The invention further relates to a powder spray chamber for coating the surface of workpieces disposed in the coating space, including a lateral inlet spray opening and a reclaiming means particularly formed as a filter arrangement for spray powder not precipitated on the workpiece. The reclaiming means includes a collecting container and a treatment means for the reclaimed spraying powder, together with conveying means for supplying powder precipitated on the floor of the chamber into a powder container, and supplying the treated spray powder to at least one spray gun.

In order to keep the powder in circulation in powder spray chambers of this type, it is necessary to first collect the powder, to prepare it for reuse, and to finally resupply it to the spray gun or guns. Collection of this type is accomplished as a rule below the filter aggregate. As the available height does not suffice in most cases, the powder is first reloaded, namely, it is conveyed upwardly at another location. There, it is prepared or passed through a mesh, and finally the spray gun is supplied away from the second storage location.

Proposals also exist (See DE-OS 25 14 160 and 30 03 158) to increase storage height such that collection or passing through a mesh occurs from the first storage location, and the powder is immediately resupplied therefrom to the spray gun. Because of the spatial distance between the first collection location below the filter aggregate and the spray gun, the conveying path is relatively long, and any pressure loss correspondingly large. As a result of this pressure loss, the coating effectiveness and the quantity of powder conveyed are negatively influenced.

This may be avoided, according to the present invention, by providing collecting containers and treatment arrangements disposed immediately next to the front side of the coating space below the inlet spray opening, and by supplying by a conveying arrangement guided by the reclaiming arrangement.

Such a conveying arrangement has become a rule, primarily for automatically operated plants, as the powder precipitated on the floor of the chamber must also be supplied to the collecting container, namely, this powder is first removed from the spray gun and must be resupplied to the same spray gun by pneumatic means. As the manufacturing and operating costs of the conveying arrangement are not substantially dependent on their load, it is without any substantial significance for the first conveying stage, namely, for the collecting container, in which direction conveyance takes place. If, therefore, conveyance initially takes place with the means known thereat towards the spray gun, then the conveying output from the collecting container, or from the treating arrangement towards the spray gun is substantially increased. The pressure loss towards the spray gun is correspondingly small, and scattering can thereby be accomplished uniformly with a small proportion of air.

Thus, the floor chamber can extend as a flat uninterrupted surface up to below the reclaiming arrangement, and can be formed as a conveying surface. It is simplest if the floor of the cabin is formed so as to increase in height up to below the reclaiming means. However, so as to save height, the floor can be connected to a vibration arrangement. It will be understood that a conveying effect can be generated merely by oscillations, but that an inclined floor, with or without any vibrator, is simpler, more cost effective, and has lower operating costs.

According to another proposal, the conveying arrangement is implemented as a scraping arrangement, and wherein, optionally, by means of a chain or the like, a single scraping leaf can be moved across a floor surface, so as to convey in one direction, and to turn aside in the reverse direction. Also, the conveyor can be implemented as a transport band covering the entire width of the cabin.

By the arrangement of the collecting container in the spraying region, it is also possible to concentrate all connections for compressed air, powder and electricity closely next to one another, and to keep the conduits short.

The present invention will be more readily understood when considered together with the accompanying drawings, in which.

Figure 1:
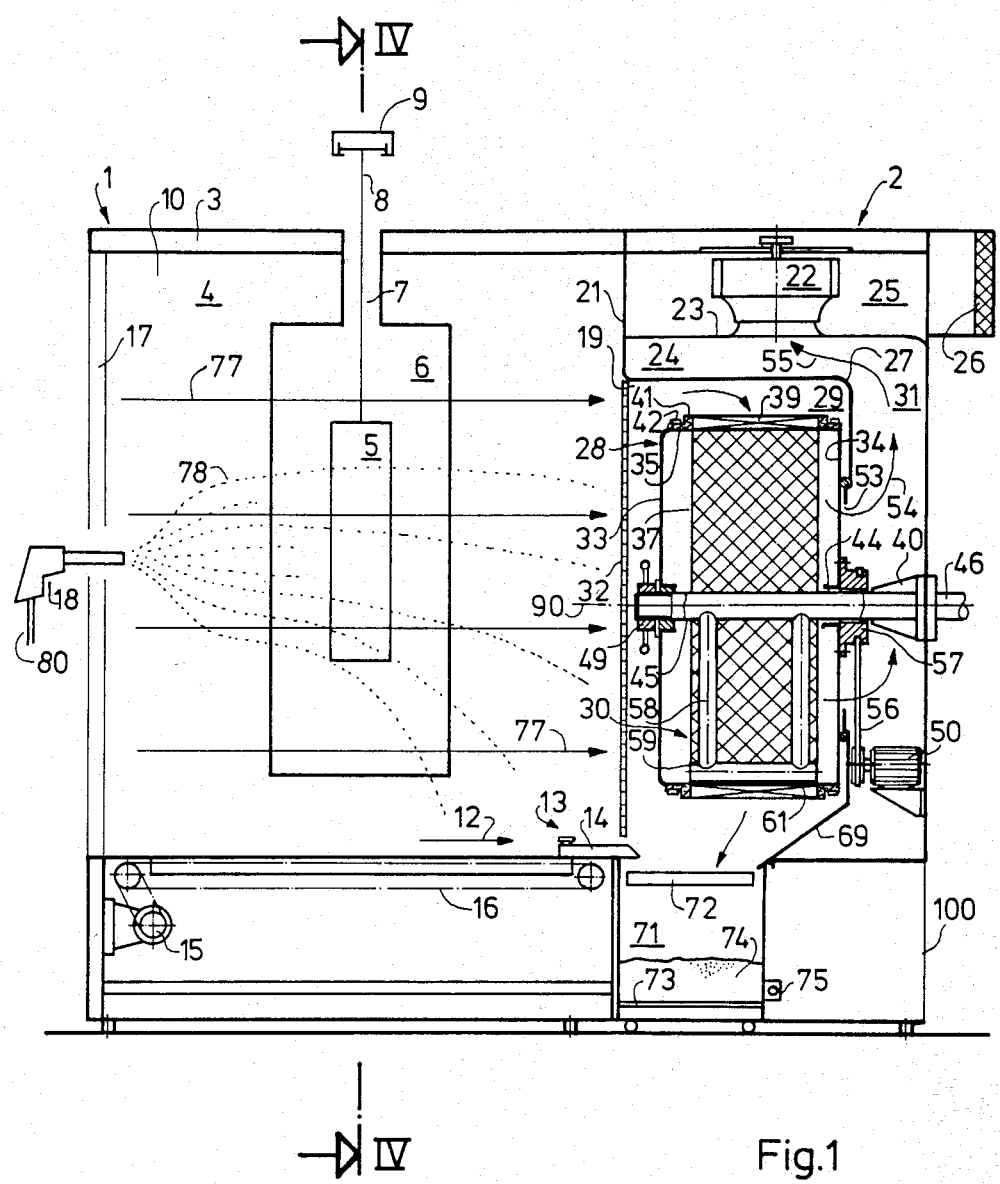
FIG. 1 is a section through a powder spray chamber, according to the present invention.

The powder spray chamber shown in FIG. 1 consists of a substantially square-shaped coating housing 1 and of a powder unit 2 joined thereto. Both parts can be rigidly or releasably connected to one another.

The coating housing 1 has two front walls 10 connected by means of two cover portions 3, which are adapted for self-actuating transport of workpieces 5 at right angles to the plane of the drawing with one through-passage 6 communicating with a covering slit 7 thereabove. Thus, the workpieces can be passed by means of a suspension 8 along a circuit conveyor 9 through coating chamber 4, while being suspended.

The floor 11 of the chamber is raised, and provided with a scraping arrangement 13 which conveys the powder in the direction of arrow 12, and whose scraper 14 is moved to and fro by a chain 16 driven by a motor 15, and which takes along the spray powder discharged on the floor during the forward movement, but is lifted from the floor during the reverse movement.

The spray inlet opening 17 for a powder spray gun 18 extends along a partial profile of the coating chamber 4. The suction opening 19 opposite thereto extends over the entire width of the coating chamber, and is narrowed on top by means of projection 21. Horizontal separating wall 23 extends from projection 21 to define lower suction space 24 and upper suction space 25. Suction blower 22 is received in upper suction space 25. Suction space or chamber 25 is isolated from the exterior through filter mats 26, so that the conveyed air can be resupplied to the surrounding space.

Figure 2:
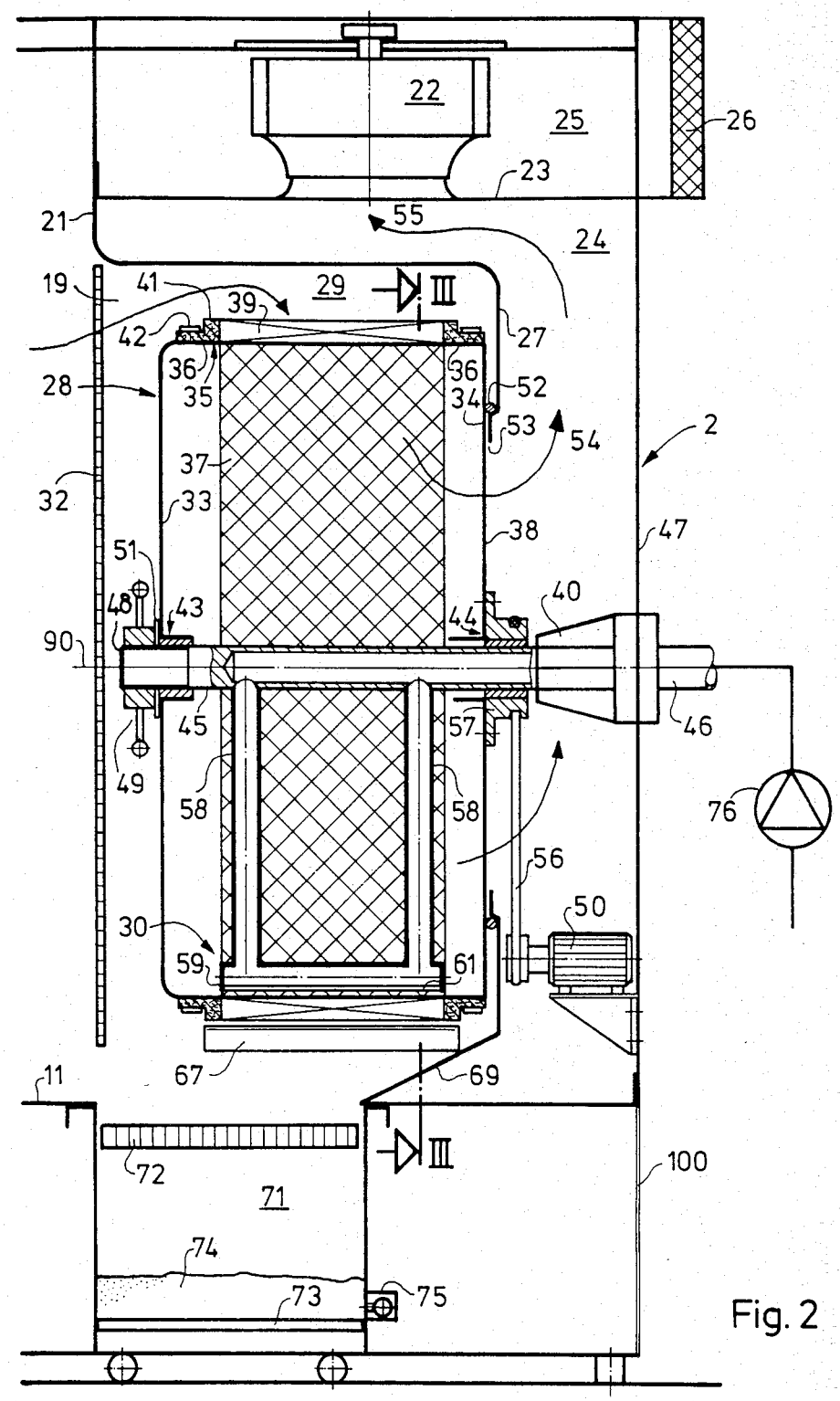
FIG. 2 is an enlargement of the right portion of the powder aggregate forming the chamber of FIG. 1.

The space below chamber 25 is subdivided by a bulge-shaped intermediate wall 27 and a filter drum 28 rotatably disposed thereon, into a chamber for raw gas 29, and into a chamber for pure gas 31, as best seen in FIG. 2.

In suction opening 19, there is provided a perforated sheet 32 in front of raw gas chamber 29 at about the height of filter drum 28. As a result of using perforated sheet 32 or a similar gas transparent shield, the larger portion of the powder particles directed to the chamber 29 for the raw gas is arrested, and can then immediately fall to the floor, without loading the filter material. The opening surfaces can thereby become smaller from top to bottom.

Filter drum 28 consists substantially of end discs 33 and 34 and a drum mantle 35 connecting them. End disc 33 consists, as do both outer parts of the drum mantle 35, and the holder rings 36, of impervious material along their entire surface. The center portion 37 of the drum mantle is, however, formed as a mesh or grating, and in the inner portion 38 of end disc 34 there are provided gas passages of a large surface.

Stretched along the mantle 35 of the drum is a filter element 39, which is formed in a known manner as a zig-zag shaped folded filter sleeve from a surface-filter workpiece such as paper, or an air-permeable track of hard synthetic material. Both ends of the filter sleeve are embedded into L-shaped front rings 41 as seen in cross section, which are disposed above holder rings 36, and are firmly clamped thereonto by clamping bands 42. The filter element with its frontal rings 41 can therefore be easily detached from the drum following release of the clamping bands 42, and again attached thereon. To faciliate this, the clamping bands 42 may be provided with a rapid closure device, for example, an eccentric tensioning element or a toggle-joint tensioning element.

The pressure tube 45 is connected to the compression blower 76 through a compressed air conduit 46, which is set to an overpressure of 0.1-0.2 bar. Filter drum 28 is rotatably disposed by means of two bearings 43 and 44 on conduit or tube 45, which is clamped through a lantern overhang-beam 40 to the rear wall 47 of chamber 31, and forms a part of the cleaning arrangement 30. At the closed free end 48 of conduit 45 there is screwed on a toggle nut 49, which holds the filter drum 28 by means of a ring disc 51 against a ring seal 52, which is disposed somewhat external to opening 53 in intermediate wall 27. The air sucked in through filter element 39 and the center part 37 of the drum mantle can therefore pass along the arrows 54 and 55 to the suction blower 22 through the passages provided in the inner part 38 of the end disc 34, and through the opening 53.

An electric motor 50 drives flanged disc 57 through belt 56. Flange disc 57 is screwed to the inner portion of end disc 34 of filter drum 28 and carries its bearing 44. Thus, motor 50 drives rotating filter drum 28.

Figure 3:
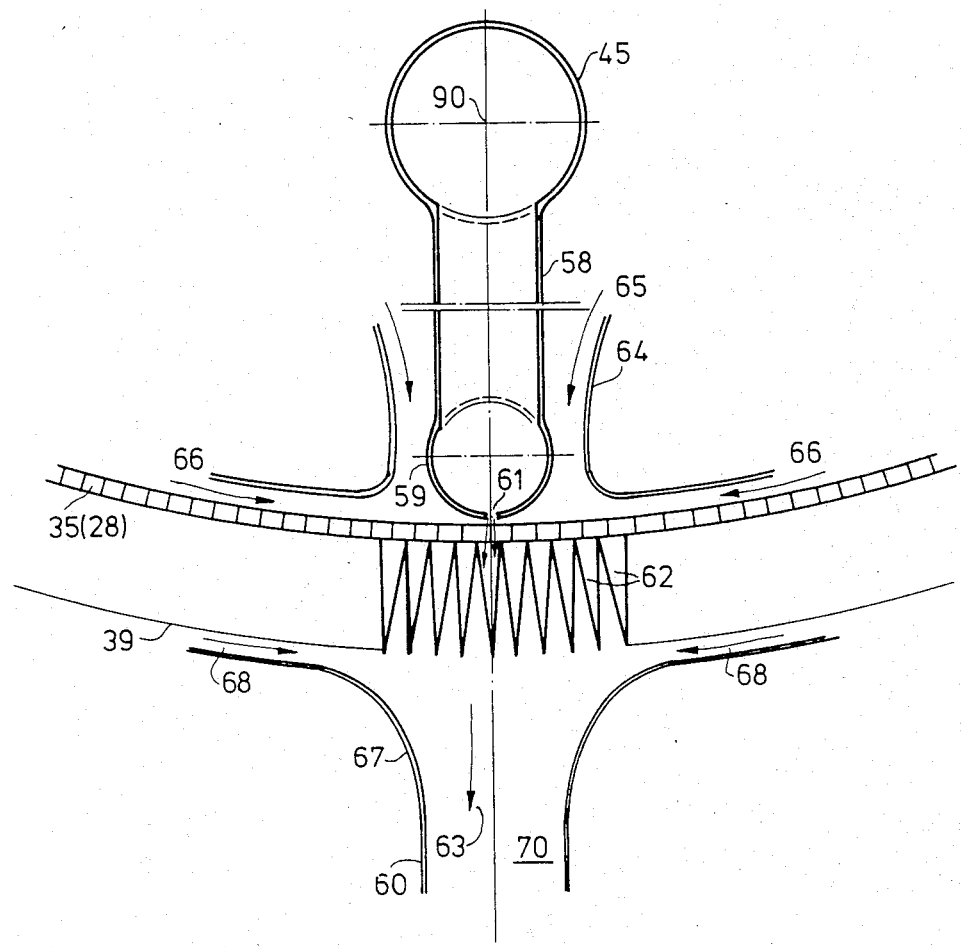
FIG. 3 is a partial section along the line III—III of FIG. 2 with guides for a secondary gas stream.

A nozzle tube 59 closed at both ends is connected to stationary pressure tube 45 through two radially extending storage tubes 58. Nozzle tube or conduit 59, as can best be seen in FIG. 3, has a very narrow nozzle slit 61 at the lower mantle line interiorly close to the mantle 35 of the drum, through which there is fed continuously or intermittently in a vertical axial plane against the filter element 39, an intense blowing stream, and wherein the stream, as a rule, passes only into one of the different folds 62 of the filter element. These folds are shown for the purpose of improved clarity in FIG. 3 with a larger angle of inclination, but, as a rule, are spaced from one another along the periphery by only a few millimeters, so that a filter surface can be disposed on a single filter mantle surface. For a relatively thorough cleaning, 50 square meters of a filter surface suffice to gain back any remainder of the powder not precipitated on the workpiece in a spray chamber, or in a spray station of a coating row.

Whether by an intermittent control of the compressed air, or by the continuous rotation of the filter drum, each fold of the filter is momentarily subjected to a pressure impulse acting against the normal direction of suction, the wall of the filter being so deformed by the pressure impulse, that any powder particles adhering thereto are dislodged and fall off in the direction of the arrow 63.

Angularly-shaped sheet metal guides 64 disposed laterally to nozzle conduit 59 serve to reinforce the pressure impulse having a widening effect thereon. Sheet metal guides 64, on one hand, guide a secondary air stream radially (to the folds 62) along the arrows 65, and on the other hand, guide further secondary streams along the arrows 66 in a peripheral direction.

Angularly-shaped sheet metal guides 67 are provided external to the filter sleeve and pass injector-like generated secondary air streams towards the center along arrows 68, which assist in dislodging the powder particles, and take these along to the lower mantle line. Of particular significance is chute 70 formed by the lower portions 60 of sheet metal guides 67 and which is also closed on its front, and therefore holds together the blower stream in the shape of a chimney and shields it against the superimposed suction stream of the suction blower 22, acting exterior of the chute. Thus, the dislodged powder particles are reliably passed downwardly, without being exposed to the action of the superimposed suction stream and possibly being returned to the filter.

Instead of a nozzle slit 61, there can also be provided a perforated nozzle of a smaller cross section movable in an axial direction, so that a higher pressure can be concentrated to act on a smaller surface. Such a perforated nozzle can be provided in addition to the slit nozzle and displaced by a peripheral angle therefrom, and can also be switched-on alternately or simultaneously with the nozzle slit. Also, a blower nozzle can be optionally disposed on the outer side of the filter sleeve, which intensifies dislodging of the powder particles by the secondary stream along the arrows 65 in a distinctly-formed sweeping process. In this manner a complete cleaning of the surface filter material is possible, so that a renewed use for other colors is possible, optionally also without any intermediate extension of the filter. So as to not to influence the pressure conditions in the coating chamber, individual cleaning processes, for example sweeping off from the exterior, can also be controllably coupled to the operation of the spray arrangement on alternate sides, and can be implemented arbitrarily, or according to a preset program.

The lower end or bottom of intermediate wall 27 passes first into an inclined floor 69, a powder carriage 71 being disposed between the inclined floor 69 and the floor 11 of the chamber. The powder carriage 71 is provided in a known manner with a motor driven mesh machine 72, and with an air floor 73 for loosening of the treated powder 74 prior to reconveyance thereof by an injector 75 to the powder spray gun 18, which can pass through an opening 100 out of the chamber housing. As can be seen particularly from FIG. 1, the travel path is relatively long.

Figure 4:
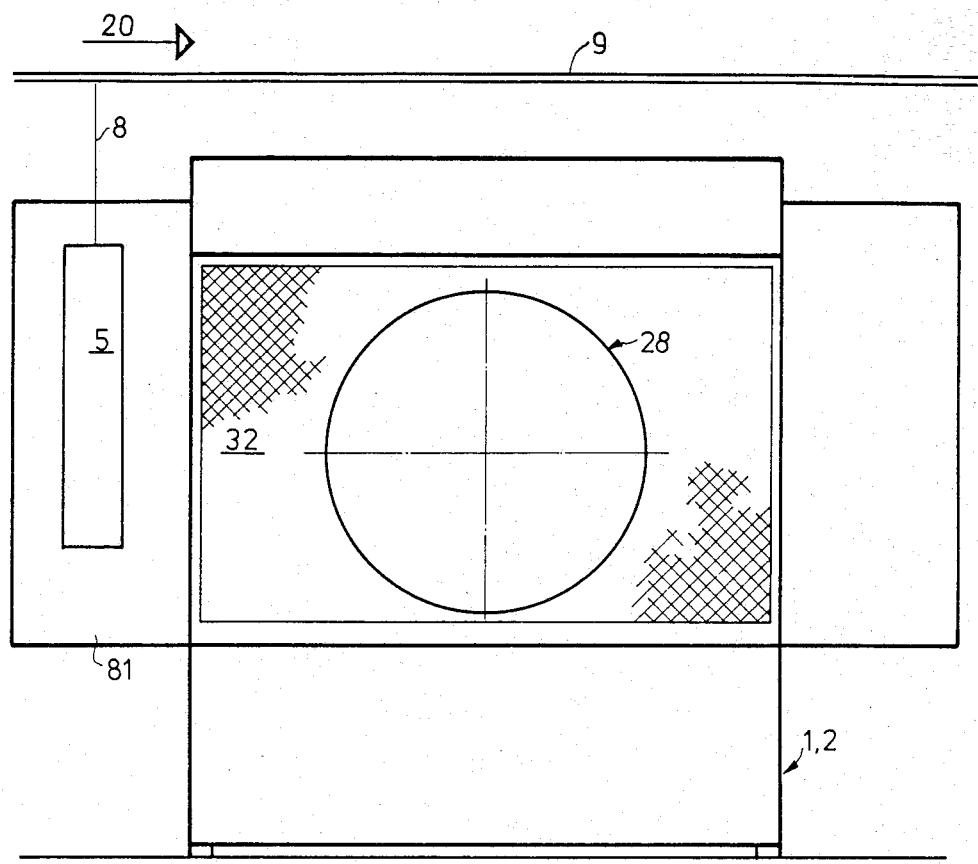
FIG. 4 is a longitudinal section through the chamber along the line IV—IV of FIG. 1.

During operation, the workpieces 5, as clearly seen in FIG. 4, are conveyed by the circuit conveyor 9 in the direction of the arrow 20 with uniform velocity. The workpieces 5 are sprayed on by the powder spray gun 18 while the suction stream sucks air from the raw gas chamber 29 from the spray opening 17 approximately corresponding to the stream lines 77, shown in FIG. 1, which extend in parallel. The spray powder is sprayed according to the respective adjusted scattering pattern at least approximately according to the trajectories shown by means of dotted lines 78 in FIG. 1. It can be recognized that the powder particles maintain their trajectory largely up to beyond the workpiece moving on the average, horizontally up to behind the workpiece, and passing to the suction opening 19 to the extent they are not pulled back to the workpiece by any electrostatic forces. There, a very preponderant portion of the powdered particles are stopped by the perforated sheet metal 32 and fall off to be passed by the scraper 14 together with the powder accumulated on the floor of the chamber to the mesh machine 72. Also, the powder particles which pass to the center of the filter drum 28 through the perforated sheet metal 32, impact with the end disk 33 of the rotating drum, without being able to adhere thereto, and fall directly onto the mesh machine 72.

Consequently, there remains only a small remainder of the powder that does not adhere to the workpiece, which passes into the peripheral region of the filter sleeve 39, and is maintained thereon by the suction force acting inwardly on the filter sleeve. This portion must be somehow released by the cleaning arrangement 30 during current operation, during pauses in spraying, or even during any change of coating, and wherein significant importance is attached to the blower nozzle directed downwardly in an axial plane. In this manner, release is accomplished primarily at the lower mantle line of the filter sleeve, so that the released powder again passes partially directly, and partially through the inclined floor 69 to the mesh machine 72. The powder sieved and treated in this manner is then passed to the powder spray gun 18 through the hose 80 by means of the injector 75, following loosening thereof by air floor 73.

From FIG. 4 it can be ascertained that the diameter of the filter drum 28 does not only approximate the available height or level, but is also larger than half the width of the powder chamber, to which two lateral tunnel extensions 81 have been added thereat.

Figure 5:
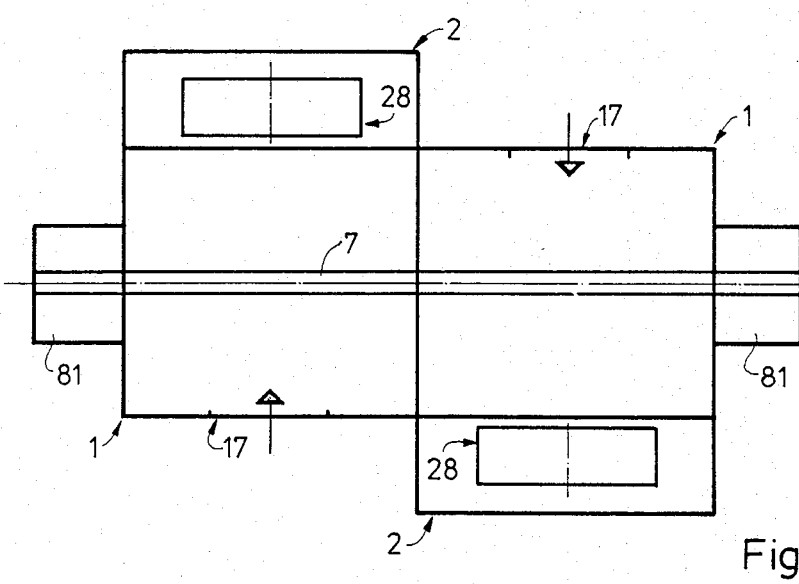
FIG. 5 is a plan view from above of two adjoining chambers of a row of chambers.

According to FIG. 5, powder units 2 are disposed on opposite respective sides of two immediately adjoining coating housings 1, and opposite a respective associated spray-in opening 17. But the connecting surfaces of the coating housing can also be formed so that one or the other side is selectively sprayed into, or suctioned off.

Figure 6:
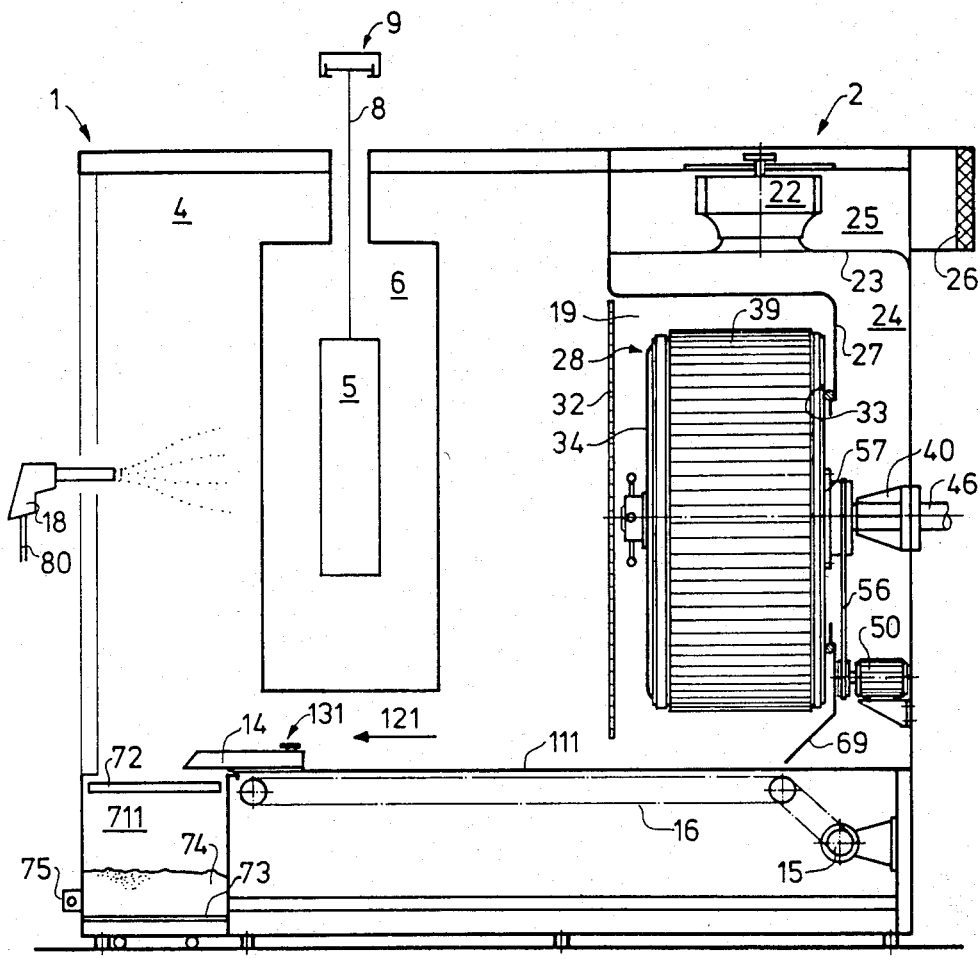
FIG. 6 is a view corresponding to that of FIG. 1 with a powder carriage arranged on the inlet spray side of the chamber.

According to FIG. 6, which largely corresponds to FIG. 1, powder carriage 711 is arranged at the front end of the chamber immediately below spray-in opening 17, and chamber floor 111 extends with a scraping arrangement 131 up the inclined floor 69 below the filter drum 28. Consequently, all spray powder obtained is conveyed away along arrow 121 from the filter drum over the chamber floor mechanically up to the powder carriage 711, which is disposed immediately next to the spray-in opening 17. Consequently, the distance between injector 75 and powder spray gun 18 is about halved. Of the pressure energy supplied to the injector 75, the larger portion consequently remains available to the particle spray gun 18, so that scattering of the spray powder can be accomplished substantially more exactly and more uniformly than during the remote spacing of the powder container as according to FIG. 1. Instead of the scraping arrangement 131, also a belt conveyor, an oscillating conveyor, or a vibrating conveyor can be used. In principle, even conveyance exclusively with an appropriate inclination of the chamber floor is possible.

Figure 7:
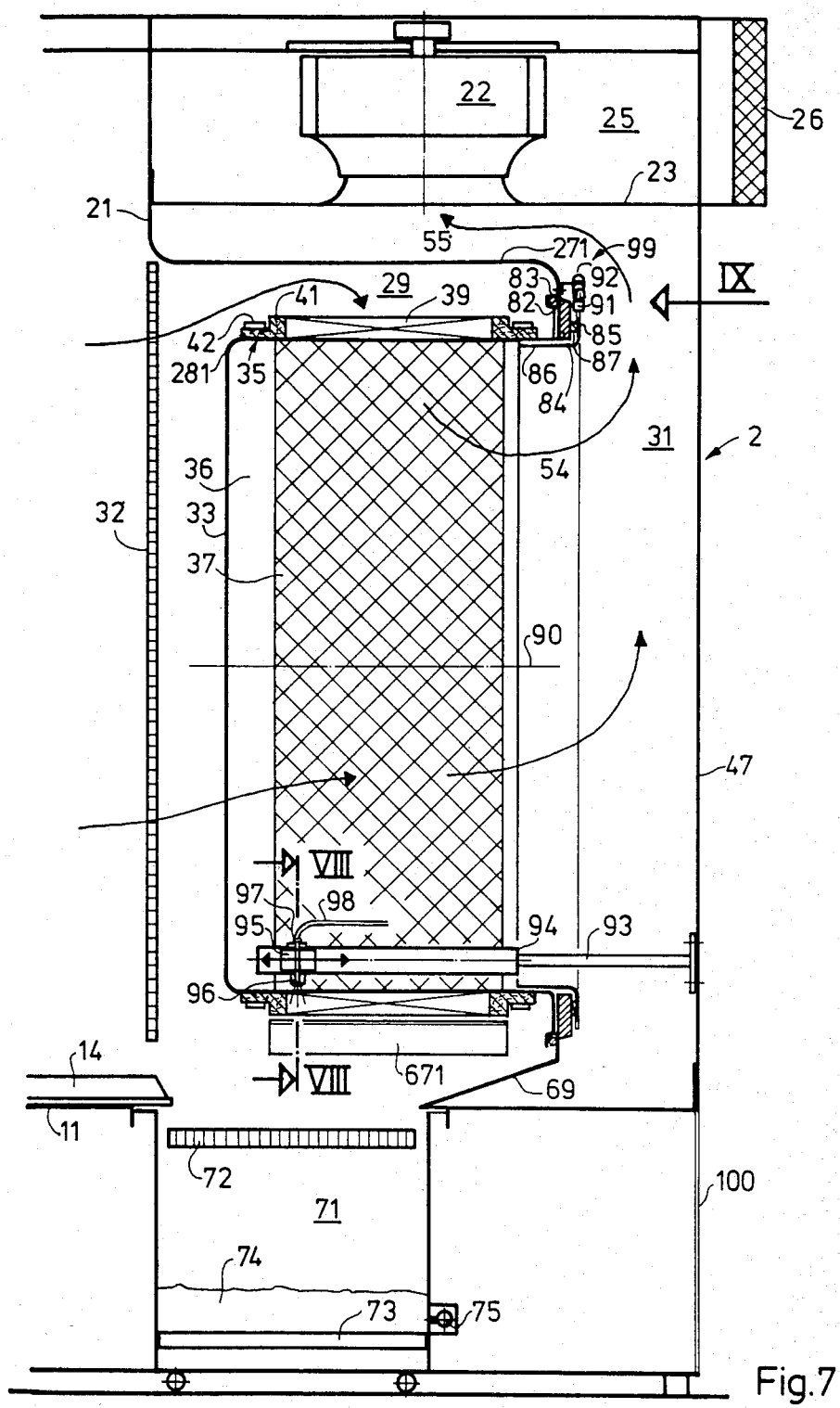
FIG. 7 is a view of a modified arrangement of the powder spray chamber corresponding to that of FIG. 2.
Figure 8:
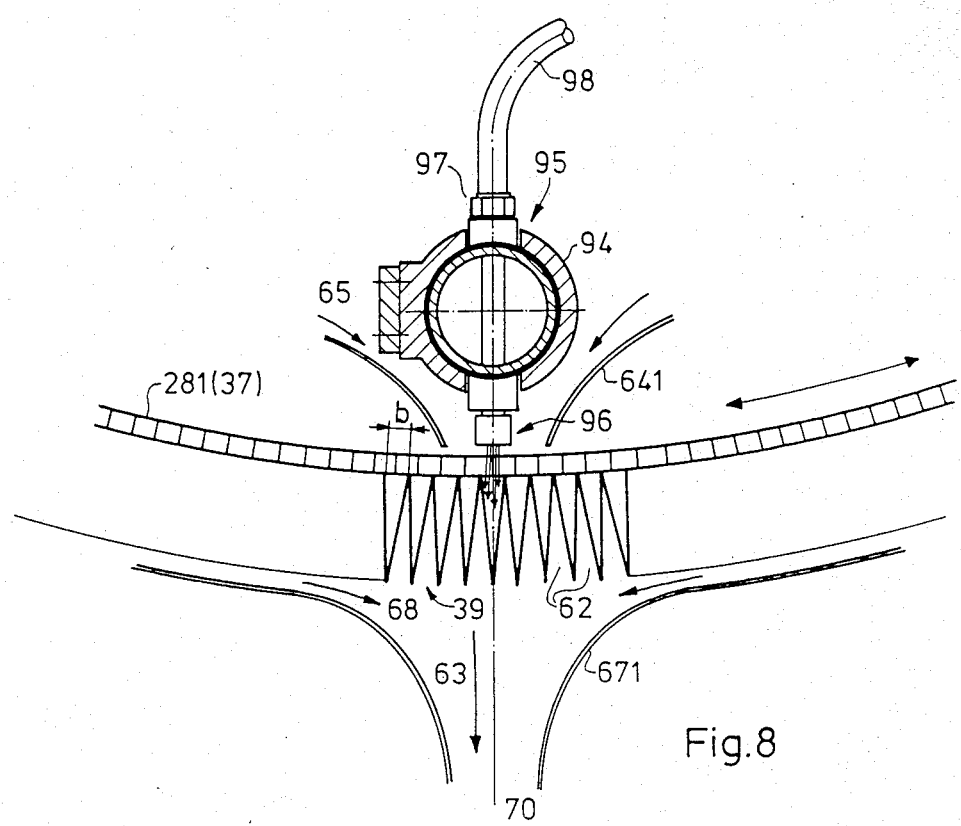
FIG. 8 is a partial section of the embodiment of FIG. 7 taken along the line VIII—VIII of FIG. 7.
Figure 9:
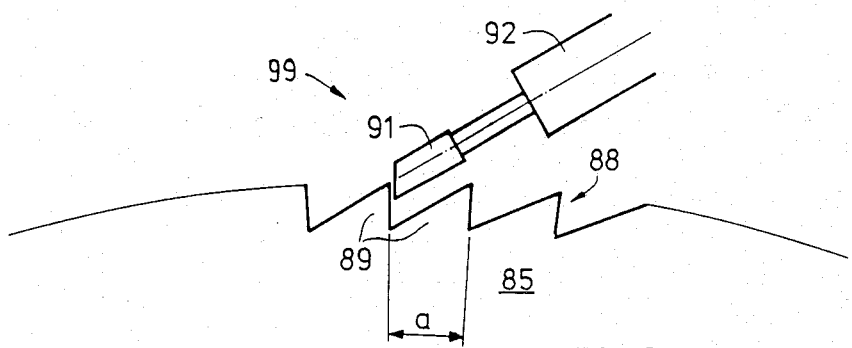
FIG. 9 is an enlarged schematic view of a latch switching arrangement taken in the direction of the arrow IX of FIG. 7.

In the filter unit shown in FIGS. 7-9, the same or similar reference numerals are used for the same or similar parts, respectively, with respect to the first described embodiment. Thus, filter drum 281 with its right end shown in FIG. 7 is immediately supported on the intermediate wall 271. For this purpose, it contains an outwardly-bent supporting flange 82, which abuts through an annular seal 83 the inner flange of the intermediate wall 271. This inner flange is reinforced by a separate outwardly set up massive ring bearing 84, and this ring bearing is gripped from behind by a flat flange 85 of an angular ring 86, which is held to the filter drum 281 either rigidly, or is yieldably prestressed in the direction of the rotation axis 90. Such a prestress can also be accomplished when the angular ring 86 is rigidly attached by interposition of a yieldably resilient ring part 87, approximately in the manner of a swinging metal.

The rim of the flange 85 is provided, as can be best seen from FIG. 9, with a saw-tooth arrangement 88, the teeth 89 of which are engaged by a reciprocally moveable drive latch, here a ram 91 of a small air pressure cylinder 92, which advances the filter drum by each stroke through a partition angle between two teeth 89.

The carrier tube 93 extending from the rear wall 47 of the chamber carries a double-acting air pressure cylinder 94, in which a blower head 95 implemented as a flying piston is guided in a known and therefore not further described manner. Blow head 95 is passed through slit covers outwardly, carrying a stream point nozzle 96 below and a connection for compressed air 97 above. Connection 97 for compressed air being connected through a hose 98 with a non-illustrated source of overpressure, which supplies a high blow pressure from 2–8 bar, preferably 6 bar.

The drive of the blow head 95 can be accomplished by means of compressed air supplied by the hose, but also by a separate connection for compressed air on the cylinder 94. But it must be insured, however, that a stroke of as uniform a rhythm as possible and at a magnitude of one or several seconds is reached. Instead of the piston arrangement shown, there can also be provided, for example, a spindle guide, or a rack and pinion guide for a blow head.

With a change of direction at the end of the stroke of the blow head 95, the air pressure cylinder 92 for the latched arrangement 99 receives simultaneously a short switching impulse. The distribution of the teeth (a) on the saw-tooth arrangement 88 is largely matched to the distribution of folds (b) of the filter folds 62. By a further advancement of the filter drum 281, there is consequently always provided a new filter-fold 62 ahead of the point stream nozzle 96 along a constant mantle line of the reciprocally moveable blow head 95. The blow nozzle advances in one fold and reverses in the next. Due to the larger pressure, the local deformation of the wall of the filter is, for a short time, considerably larger than in the aforedescribed slit nozzle. Consequently, the cleaning effect is also improved.

The guide sheet metal 641 and 671 are, however, formed differently, but they serve basically the same purpose as the guide surfaces shown in FIG. 3. The corresponding explanation should be referred to.

It is to be understood that the foregoing general and detailed descriptions are explanatory of the present invention and are not to be interpreted as restrictive of the scope of the following claims.

What is claimed is:

1. A powder spray chamber having at least one inlet spray opening for coating the surface of workpieces disposed in a coating space of said spray chamber, including:

(a) a rotationally symmetrical filter carrier having a gas-permeable mantle portion and gas non-permeable end portions;

(b) a rearwardly disposed separating wall in said chamber separating said coating space from a clean air space;

(c) an opening in said separating wall within which said filter carrier is rotatingly supported to sealingly project therefrom its free end into the coating space;

(d) gas passages provided in the center area of the end portion of said filter carrier directed towards said clean air space;

(e) a sleeve-like filter element carried on the gas-permeable mantle of said filter carrier by means of two frontal rings, said filter element being removable into said coating space;

(f) a vacuum source in said clean air space establishing a vacuum on said filter carrier mantle through the gas passages of said end portion of said filter carrier; and (g) cleaning means associated with the gas-permeable mantle portion of said filter carrier for cleaning said filter element.

2. The powder spray chamber according to claim 1, wherein said filter carrier includes an axle directed horizontally approximately towards the center of said coating space, and said cleaning means includes at least one blow nozzle directed downwardly, said blow nozzle being disposed on the lower mantle line of said filter element.

3. The powder spray chamber according to claim 1, wherein said filter element comprises a zig-zag shape folded filter sleeve.

4. The powder spray chamber according to claim 1, wherein said frontal rings consist of an elastic synthetic material deformable within limits.

5. The powder spray chamber according to claim 1, wherein annular tension elements such as ring-shaped tension bands are associated with and surround the individual frontal rings.

6. The powder spray chamber according to claim 2, which further includes guide metal sheets disposed at least within the filter element for an injector-like generation of a secondary stream.

7. The powder spray chamber according to claim 6, wherein said metal sheet guides are disposed external to the filter element at least on two longitudinal sides of the plane of the blow stream created by said blow nozzle for guidance of the released powder particles from the suction region of the filter element.

8. The powder spray chamber according to claim 2, wherein said blow nozzle is formed as a slit nozzle along a mantle line of the filter element.

9. The powder spray chamber according to claim 2, wherein said blow nozzle is a point stream nozzle reciprocally moveable in the direction of the axis of rotation of said filter carrier.

10. The powder spray chamber according to claim 8, which further includes a point stream nozzle peripherally off-set along said mantle from said slit nozzle and said nozzles being switchably selectable.

11. The powder spray chamber according to claim 1, wherein a freely-projectable support arm projects towards the coating space being provided for supporting at least one holder ring of said filter carrier.

12. The powder spray chamber according to claim 11, wherein said supporting arm is implemented as a conduit for compressed gas for at least one cleaning blow-nozzle.

13. The powder spray chamber according to claim 1, wherein said filter carrier is flyingly supported in said opening of said separating wall separating the raw gas chamber from the clean air chamber by means of a ring bearing.

14. The powder spray chamber according to claim 1, wherein a step switching mechanism is provided for driving said filter carrier.

15. The powder spray chamber according to claim 14, wherein said step switching mechanism includes teeth formed on the outer rim of an annular flange connected to said filter carrier and an advanceable ram engaging said teeth.

* * * * *